(12) United States Patent
Tamayo Ruiz et al.

(10) Patent No.: US 12,348,032 B2
(45) Date of Patent: Jul. 1, 2025

(54) APPARATUS ENABLING INTERACTIONS BETWEEN ACTORS OF AN ENERGY-RELATED INFRASTRUCTURE

(71) Applicant: Hitachi, Ltd., Tokyo (JP)

(72) Inventors: Efrain Eduardo Tamayo Ruiz, London (GB); Gabriele Meldaikyte, London (GB); Nao Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 620 days.

(21) Appl. No.: 17/696,039

(22) Filed: Mar. 16, 2022

(65) Prior Publication Data
US 2022/0302750 A1 Sep. 22, 2022

(30) Foreign Application Priority Data
Mar. 17, 2021 (EP) .................................... 21163217

(51) Int. Cl.
*H02J 13/00* (2006.01)
*G06Q 50/06* (2012.01)

(52) U.S. Cl.
CPC ........ *H02J 13/00034* (2020.01); *G06Q 50/06* (2013.01); *H02J 13/00001* (2020.01); *H02J 13/00002* (2020.01); *H02J 13/00004* (2020.01); *H02J 2300/40* (2020.01)

(58) Field of Classification Search
CPC ........... H02J 13/00034; H02J 13/00004; H02J 13/00001; H02J 13/00002; H02J 2300/40; G06Q 50/06
See application file for complete search history.

(56) References Cited

U.S. PATENT DOCUMENTS

2015/0288181 A1 10/2015 Mokhtari et al.
2020/0410590 A1* 12/2020 Regmi ................ G01N 33/383

FOREIGN PATENT DOCUMENTS

JP 2020-107201 A 7/2020

OTHER PUBLICATIONS

Japanese Office Action issued on Apr. 4, 2023 for Japanese Patent Application No. 2022-037666.

* cited by examiner

*Primary Examiner* — Gary Collins
(74) *Attorney, Agent, or Firm* — Volpe Koenig

(57) ABSTRACT

The present disclosure relates to, in particular, an apparatus enabling interactions between actors of energy-related infrastructure, which comprises a platform device that includes: one or more input/output units, which are configured to transmit data from the platform to actors 2 to 7 and/or to receive data from actors 2 to 7; a data gathering module and a first actor support module.

17 Claims, 7 Drawing Sheets

APPARATUS ENABLING INTERACTIONS BETWEEN ACTORS OF AN ENERGY-RELATED INFRASTRUCTURE

The present disclosure relates to an apparatus, e.g, enabling interactions between actors of an energy-related infrastructure or energy systems for pushing the transition to a green and environmental-friendly energy infrastructure/system.

BACKGROUND

As part of the necessary actions to achieve the climate change prevention pledges made by public and private organisations, power systems need to succeed in the transition to low carbon power systems. A particular characteristic of power systems is the interdependence between key actors (participants or stakeholders), i.e. generators, consumers and system operators, and because of this interdependence it is necessary to coordinate their actions to ensure their compatibility, optimisation and the like. Currently, the lack of coordination of transactions and interactions between the actors results in inefficient allocation in resources and in uncertainty about the potential or actual environmental performance.

There are technologies that provide functions, such as distribution network management, as explained in US 2015/0288181 A1, and they use/manage the environmental effect of CO2 emissions or the like in a power network. However, there is a need for a technical solution which manages, coordinates or facilitates the interactions and transaction of actors in the energy-related infrastructure/systems better so that greener energy solutions can be found and realized. System constraints shall be considered automatically or by system-design which are often unknown to the external actors. Green energy shall relate to, in particular, types of energy which are sustainable and more environmental friendly than fossil fuel based technologies or consumer technology which has a low energy efficiency.

Problem and Solution

It is an object of the herein described disclosure to provide an apparatus which enables to provide, in an automated fashion, a coordination between actors of an energy-related infrastructure so as to push the employment of green energy technology. The apparatus shall preferably help to improve the interaction among actors and/or between actors and the apparatus. The object is solved by the appended claims.

The following aspects are provided in particular:

An apparatus which may comprise a platform device or platform unit. The apparatus may, in particular, be configured to coordinate and/or facilitate and/or promote interaction between actors of energy-related infrastructure/systems. The actors may be entities or persons or users of the apparatus which are external thereto. The interaction between the actors may, in particular, include contractual interactions. Further, the interactions may also include interactions between the platform unit (or the apparatus) and the external actors, i.e. users or the like; e.g. this may include computer-based operations and/or input/output of computer control commands and/or information.

The platform device (or the apparatus) may have one or more input/output units. These may be configured to transmit data from the platform to the external actors and/or to receive data from the actors. The input and/or output units may be software-based and/or hardware-based communication interfaces or the like.

Further, there may be included a data gathering module and a first actor support module, wherein the latter may also be called operational recommendations calculation module in the following. The modules are preferably a software program product or a sub-entity of a software program product; the latter applies especially if, as in a preferred alternative, the entire apparatus or the entire platform device is a software program product. The data gathering module may receive data from other entities, external and internal, and especially the data gathering module may be configured to receive operational data from one or more actors, wherein these actors who provide operation data are preferably actors which belong to a "first group" of actors. The actors may be a single one or a plurality of actors.

Further, the data gathering module may be configured to provide said received data to the first actor support module which may be configured to generate operational information data based on said received operational data. The operational information data generated or calculated by the first actor support module may include control data and/or operational recommendation data for the first group of actors or at least one actor thereof. The first actor support module may further be configured to transmit the operational information data to the group of one or more first actors (or differently stated the actors of the first group of actors). The first actors or the actors of the first group of actors may include energy generators, energy consumers and/or energy system operators. For example, energy generators (or briefly generators) may be companies, households, persons, power plants and/or devices, etc. who generate energy, for example which generate electricity for the grid. The generators may include or own technical equipment such as wind turbines, gas turbines, solar cells, biomass-based plants, other power plants, and the like. The consumers may be companies, persons or devices consuming, e.g., electricity provided by the grid or otherwise. The energy system operators or distribution system operators (briefly "DSO") may, for example, be technical systems, devices and/or persons or companies who are/own/run energy-distribution devices, energy-storage devices, and the like; preferably and especially they do operate part of the grid and or own part of the grid.

The operational information data may include control instructions and/or recommendations for reducing the generation and/or consumption of greenhouse gas or for increasing green energy. The operational information data may, for example, include information about the energy source and its "greenness" which shall mean that the operational information may include information about an ecological rating or characteristic of an energy source, of an energy generation means, and/or of an energy consumer. In other words, the information may include an energy coloring scheme according to which colors indicate the eco-friendliness of the type of energy, the source, or the like. The first actor support module and the operational information data, e.g., may evaluate the project data of an actor included in the operational data received from the data gathering module and it may evaluate "how" green the project is or will be. For example, if a project may include the generation of renewable energy by a wind farm and a distribution of said energy via highly-efficient (low loss) transmission means to customers which use said energy in a very efficient manner, said project may be rated dark green; while a project which partially relies on carbon-based energy, or other less optimal solutions in view of environmental or social aspects, the project may be rated "less" green, e.g., light green or even orange or the like. Further, the operational information data may include system constraints of the first actors, such as power limitations, maximum power generation, minimum power demands, power line capacity, voltage control, reverse power flow constraints or the like, which can be taken into account.

The operation information data provided to the generators, the consumers and/or the distribution system operators will improve their decision-making in view of planning projects, such as construction of new energy-friendly infrastructure, obtaining more environmental friendly devices, transforming a business to an ecological one, consuming less energy, etc. In other words, the operational information data may alternatively or additionally include information about likelihoods of investment, official regulation demands, and the like so that the environmental characteristics of a project are mapped to possible interest of investors and regulation requirements and other boundary conditions. This will even further drive the first group actors to implement measures and to realize projects which are pushing a transformation to sustainable and ecological energy-related system or energy infrastructure which includes all three main actors of the first group of actors. Therefore, a control can be realized which directs the actions of the first group actors based on the operation information data including these control/recommendation information.

According to a further aspect, the apparatus may further include a second actor support module which may also be named Indicators calculation and Certification module. Said module may be configured to receive said operational information data from the first actor support module via a platform device internal communication channel that may be realized by hardware and/or by software. Further, it may be configured to generate indicator and/or certification data which may be transmitted to external actors of a so-called second group (i.e. second group actors) which may be named, for example, users of the platform device. The users may have different motivations to use the platform and they may be different users, such as project investors, traders, regulators or the like. The users may use the platform device by connecting thereto with a computer and via a communication channel that has an interface input/output unit with the platform device. The communication channel preferably is a wireless and/or wire-based connection to the remotely located user, and the platform may be a part of a computer network, or may be stored and processed by a computer network, e.g., the internet, or any cloud-based infrastructure. Any other kind of network or connection infrastructure may also be possible and preferably the user communication is encrypted end-to-end.

The second actor support module may be further configured to transmit said generated indicator and certification data to the group of one or more platform-external second actors which may be traders, stakeholders, regulators, etc. Preferably, the indicator and certification data include information provided to the users about the first group of actors. The indicator and certification data may be generated based on the operational information data and the operational data of the data gathering module and of the first actor support module, respectively, wherein the indicator and certification data, for example, may include performance indicators or key performance indicators (KPI) based on the operational data and the operational information data, especially in view of ecological aspects, investment aspects, regulation aspects and/or legal/compliance aspects of projects operated or carried out by the first actors.

Based on the indicator and certification data the second group of actors may decide about a transaction with one or more of the actors of the first group of actors and/or based on which the second group of actors may instruct the platform device/unit to perform an automated transaction with one or more of the actors of the first group of actors. The first alternative above addresses a transaction directly with one or more of the first group actors and this may include investing in a project of a generator of the first group actors, or providing regulation requirements or legal requirements to a first group actor who wants to realize a project, and the like. The second alternative above may address, in particular, that the user, such as an investor, may connect with the platform device which offers the user an option to invest, as an exemplary transaction, into a project planned or already run by an actor(s) of the first group of actors. With an interaction with the platform device, the user may then initiate an automated transaction by which, for example, the user invest into a project by transferring values via the platform device to the first group actor while the latter transmits via the platform a share or any other type of participation to the user.

Hence, a knowledge-based and centrally coordinated or facilitated transaction, which can be carried out automated via the platform device, is enabled with a bias or focus on increasing green energy production and consumption on the infrastructure side, i.e. the first actor side. In other words, the apparatus automatically provides guidance to the different group of users and considers interdependencies, for example since the recommendations to the first actors is based on parameters which are then used for providing transaction information to the second actors, a coordinated approach can be realized by the different actors to transform energy systems to a greener status. Since the entire communication with, to and from the apparatus/platform device is preferably encrypted and since the platform may include a database for identity profiles of each actor, the platform device also enables to act as a trust agent because it can verify the identity of each actor before a transaction is performed. This may be done by a cross-check between the identify information in the database and newly entered verification data, such as a biometric data, passwords, and/or the like.

According to a further aspect, the apparatus may further include a transaction control module or briefly trading module configured to: receive data from the data gathering module and the first actor support module based on which the transaction control module may generate project product data (or briefly product data) and actual products, such as investable/tradeable assets or the like, wherein the product data include the key data about the products, and the product data may be displayed to a group of one or more second actors which are users of the platform unit. In other words, if the platform device preferably includes a front-end module or graphical user interface (GUI) module, it may provide the product data to the user on a display via a GUI, preferably such that the user may simply click on a part of the GUI to get information of the product and the related project which is displayed in this part of the GUI and it may further be possible to invest/buy the product or a part thereof by clicking on a button or the like of the GUI.

Preferably, the one or more users can initiate a transaction for obtaining a project product by interacting with the transaction control module, such as clicking on a part of the GUI-area and this causes the transaction control module to transmit a transaction request signal to an actor of the first group of actors who can then agree or reject the transaction or the transaction control module has the agreement received by the first actors already beforehand and confirms the transaction success instantly to the second actor/user, whereas the first actor will receive a value such as money via the platform device.

Preferably, the transaction control module receives the user request for initiating a transaction for obtaining a product and forwards said request, in an automated manner, to at least one of an actor of the group of first actors and/or to another entity outside of the apparatus so that a contract or the like can be concluded based on said request. The other entity or entities may be stock markets or the like. As noted above, due to the platform device/apparatus as the agent in between and, among others, its technical configuration for identifying each actor accessing the apparatus, safety and reliability of the transaction scan be ensured at any time. Especially, since the apparatus may further include databases or storage means for storing the operational data from the first group of actors, for storing identity features of the second group of actors and in addition possibly trust indicators, solvency indicators and the like, and further databases about the projects, the products and so on, combined with end-to-end encryption of all communication within the apparatus and to the external actors, the investment safety for each actor can be reliably ensured while a push to green energy can be initiated and maintained.

Preferably, a transaction between at least one user of the group of second actors and at least one actor of the group of first actors can be carried out by adding or amending an entry about the transaction in a blockchain network. In other words, the apparatus may include the blockchain network or it may have communication connections thereto which may be end-to-end encrypted. If a transaction is realized between two actors, e.g., the contract between them may be stored in the blockchain so as to ensure that the contract data cannot be corrupted or the like. This ensures further safety for all actors using the apparatus.

In another aspect, at least one actor of a group of one or more first actors may receive the operational information data transmitted by the first actor support module and may initiate a new project in accordance with the operational information data and further may feedback operational data including operational data of said new project to the data gathering module of the platform device. The interaction may, for example, include that the operational data of an electricity generator are collected by the data gathering module and based on these the first actor support module may generate the operational information data which provide recommendations and possibly incentives to the electricity generator for realizing a new power plant based on renewable energy sources, such as a new wind park. If the wind park is then realized, the operational data thereof may again be used by the data gathering module and the first actor support module to iteratively push for additional green projects or to provide operational information data to a consumer to increase the use of the electricity stemming from the new wind park, or the like. At the same time, the second actor support module may provide KPI's to the second group of actors supporting/prompting their investment in these green energy projects or the like.

Preferably, the operational information data may be used to calculate the indicator and certification data (ICD) which may include performance indicators associated to compliance, risk and opportunity assessments.

Preferably, the transaction control module, based on the operational information data, may be configured to generate products for internal trading or for trading with external markets. The products may be generated based on the operational data and operational information data so that, e.g., if a first group actor intends to build a new wind farm or has built it, tradeable shares or the like may be automatically created by the apparatus which can then be obtained by the second group users displayed via the transaction control module. In other words, the apparatus facilitates any kind of interaction between the different actors and automates it with a focus of increasing green transformation of the first group of actors.

Preferably, the transaction control module can also provide optimized peer-to-peer transactions (or it can optimize the transactions), for example and preferably, of products which were generated based on the operation information data and/or further information. The selected operational recommendations may be those that can be converted into products and traded among the users, such as the first actors, with assets (power generation, consumption, network use) connected to the platform device. This brings about the technical benefits that including system constrains of the first actors (such as included in the operation information data) reduces uncertainty and improved assessment accuracy, using system constrains increases decision making for investment, increases accuracy for projects of the first actors and can support to justify network investment. The modelling thereof can be performed also by combining data from one or more of the first actors to determine a first score S1 and/or a second score S2. Further beneficially, an interdependence limitation threshold can be increased by an optimized peer-to-peer transaction facilitation, wherein the term peer-to-peer shall indicate, as a preferred example, that stakeholders are not involved determining the allocation of resources. In other words, a focus point is the optimisation of peer-to-peer transactions among the users, e.g. first actors, with assets (such as power generation, consumption, network) connected to the platform device. In particular, optimisation may result from determining the timing of the operational recommendations and the unit pricing according to the timing resulting in the increased interdependence limitation threshold. The unit prices may correspond to generated or consumed electricity and to the use of the network to transmit or receive electricity.

The products may be tradeable as a whole and/or they may be splitable to match equivalent N products or assets inside or outside the platform device that are exchanged for, and vice-versa. This means, in other words, among others, that the products may be virtually split into sub-products so that even parts of a project product can be open for an investment. For example, if for a project 10000 shares are available, these shares may be split into sub-shares and a trader may also obtain only 0.1 parts of one share.

Further, the trading results and operational data may be integrated into the calculation of the performance indicators associated to compliance, risk and opportunity assessments, so that another feedback loop is created for the apparatus-handled data which increases reliability even further.

The transaction control module may facilitate transactions of payments, revenues, investments, repayments and the fulfilment of other financial or reporting obligations among platform device users and (other) external parties. All of the transactions may be stored in or performed via a blockchain for maximum safety of the data and data corruption prevention.

Further, the operational information data may be generated by the first actor support module based on interaction beyond one system, for example a system of first actors, and/or based on the operational interdependence among multiple systems or within systems of systems, preferably the system of first actors. This may mean that, for example, actors of the first group of actors of a certain geographical region may form a system which has specific rules, requirements and boundaries due to, among others, the geographical location. Then, the operational information data may take these into account and, further, the operational information data may further take into account the consequences of connecting systems of other regions or the like with each other. Concretely, northern European regions may exhibit regional conditions which favour water power based electricity generation while countries in Northern Africa or so may be favourable for solar-based projects. Such boundaries and the like may be taken into account for the generation of operation information data, such as recommendations.

Preferably, the operational information data are based on environmental, social, governance and/or sustainability considerations.

According to another aspect the apparatus may comprise one or more computers which may be configured to perform the functions of the platform unit. The configuration may, e.g., include that the computer(s) execute software program(s) for realizing the above explained functions of the apparatus/platform device.

According to another aspect the apparatus may comprise one or more computation units and one or more data storage units, wherein the data storage units store one or more computer-program products which are configured to perform the functions of platform unit as explained above. The computer units and data storage units may be distributed in view of their geographical location and may be connected via a network and/or they may be connected via a network(s) to the actors.

The apparatus may be connected via a network to a blockchain network and wherein the data transmission between the apparatus via the network to the blockchain network is encrypted so that maximum data safety of the users/actors is ensured.

DETAILED DESCRIPTION OF EXEMPLARY ASPECTS

Figure 1:
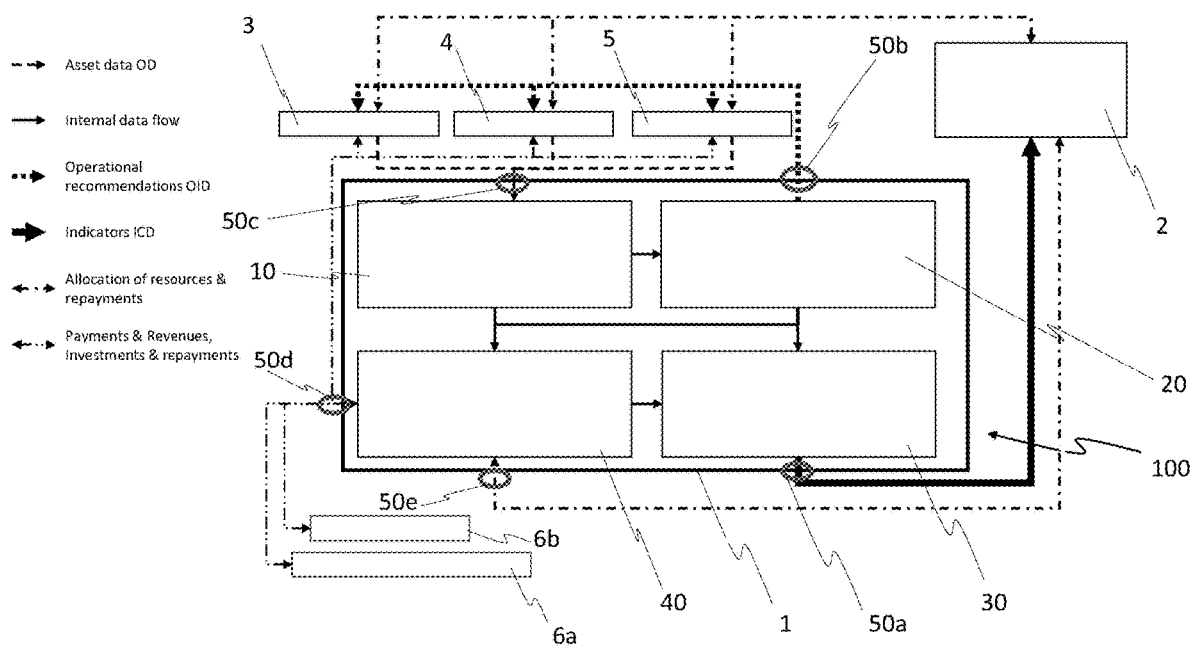
FIG. 1 shows an apparatus as described herein.

In the following, preferred aspects and examples will be described in more detail with reference to the accompanying figures. Same or similar features in different drawings and examples are referred to by similar reference numerals. It is to be understood that the detailed description below relating to various preferred aspects and preferred examples are not to be meant as limiting the scope of the present disclosure.

FIG. 1 shows an apparatus 100 which includes a platform device/unit 1 (or briefly: platform) that it configured to perform specific tasks via different modules. The modules included in the platform device 1 can be hardware-based and/or software-based modules, preferably the entire platform device 1 is a software program product executed by one or more computers and stored on one or more storage devices/units. The modules include a data gathering module 10, a first actor support module 20, a second actor support module 30 and a transaction module 40 which can be configured to exchange information with each other, i.e., they can be communicably connected. Said connection is indicated by unbroken arrows which are shown inside of the platform device 1, i.e. these arrows show the preferred communication paths and directions of the internal data flow of the apparatus 100.

Further, the apparatus 100 has interfaces which enable a communication connection to outside or external entities, such as actors. These interfaces or input and output units 50 are indicated by bold circles in FIG. 1 and they are marked with the reference signs 50a, through 50e. The number of interfaces may also be higher or lower and the example of FIG. 1 shall only improve the understanding of the general concept.

Figure 3:
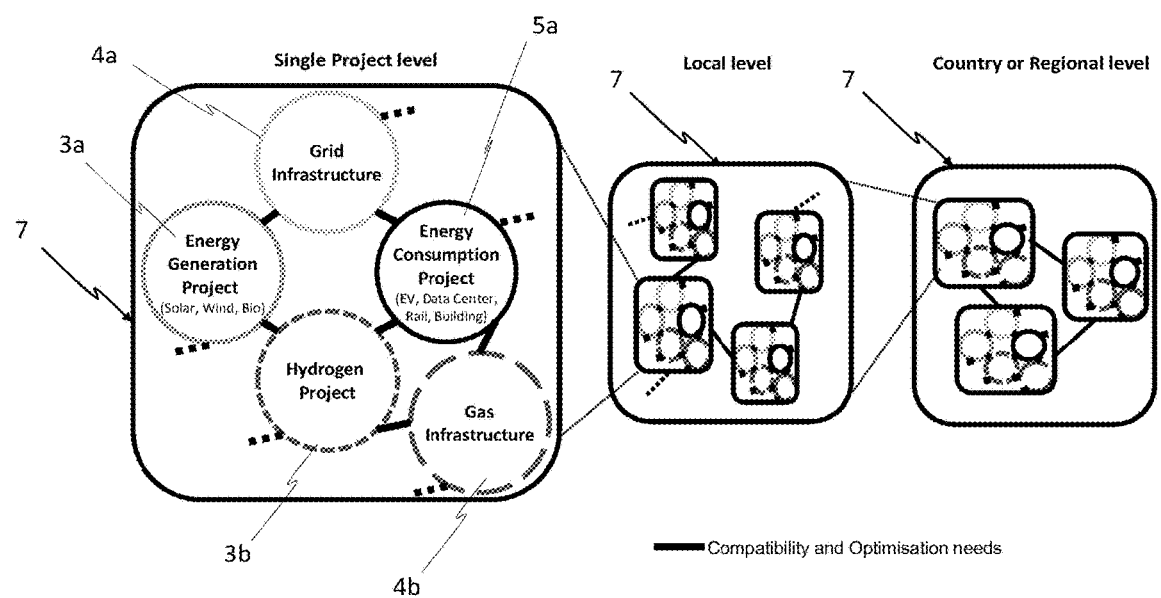
FIG. 3 shows projects and their scalability.

Further, FIG. 1 depicts that the data gathering module 10 is connected to outside actors, to which it is also referred as "first actors" or "actors of a first group of actors". These first actors are summarized by reference sign "7", e.g., as shown in FIG. 3. The communication connection, which may be configured to be a wire-based or wireless communication connection, is shown by the broken arrows in FIG. 1 which point from the group of first actors 7, differentiated by reference signs 3, 4 and 5, to the data gathering module 10 via the interface 50c. The first actor having reference sign "3" shall be considered as a "generator" in this example, i.e. an entity, a person or a technical equipment which generates energy, e.g. electricity, heat, cooling, or the like. The first actor having reference sign "4" shall be considered as a "consumer" in this example, i.e. an entity, a person or a technical equipment which consumes energy, such as a household, an electrical device, a factory, or the like. The first actor having reference sign "5" shall be considered as a "system operator" (briefly: "DSO") in this example, i.e., an entity, a person or a technical equipment which, among others, distributes energy or the like. This may be, specifically, an operator of the grid, an owner of landlines, or the like. The actors 3, 4, 5 may be a single or a plurality of actors. The flow of data, as shown by the broken arrows, from the first actors 3, 4 or 5 to the data gathering module 10 may be also called "asset data" or "operational data" (briefly: "OD") which include information about the technical operations, technical status, business indicators, and the like about a project, an asset or the like which is run, owned, and/or planned by a first actor 7.

The operational data OD is received by the data gathering module 10 may, in particular, exhibit a signature using energy coloring. For example, in view of the generators 3, each load may have a signature of energy consumption and it can be identified. In this case the coloring is about the type of load and the consumption efficiency of the load. For example, in view of the consumers 4, metadata can be transmitted that enables traceability that helps to understand what kind of energy source it is used, such as fossil, solar, wind, bio mass or the like, from where, e.g. far away or nearby it comes, and so on. In other words, a "Green Tag" or an individual blockchain certificate could be used for the traceability of the energy source. The DSO actors 5 may rely or use grid reinforcement that can have verifiable positive environmental impacts such as enhanced integration of renewable energies or the like.

Furthermore, the operational data OD may in addition or alternatively include static data and/or dynamic data. The input to the platform device 1 regarding static data could be data about, e.g., asset specifications, fixed costs, unit prices, or the like as well as data about technical status of the operator or his machines, such as efficiency, power output or the like. The dynamic data, e.g., may include data about the operations of the first actor 7, such as daily power generation achieved, revenues and the like. The operational data may originate from heterogeneous sources, such as the generators 3, the consumers 4 and the system operators 5.

Based on the operational data, gathered and forwarded by the data gathering module 10 to the first actor support module 20, operational information data OID are generated by the first actor support module 20. These operational information data OID are then sent to the one or more first actors 7 or to parts of them depending on for which project the operational information data OID are relevant. Specifically, the operational information data OID may include, e.g., operational recommendations to each project to enhance the individual and mutual technological, environmental and business performance. Based on the interdependence of the generators 3, the consumers 4 and the DSOs 5 to enhance environmental and business performance so that from the individual incentive to enhance them emerges the mutual and overall enhancement in the power system with a push for green energy. Further, the operational recommendations can relate to physical, e.g., installed assets or devices in operational phase or virtual assets or devices, e.g., assets in planning phase or virtually aggregated physical assets. Preferably, the operational information data OID include control or recommendation data which support the actors of the first group to perform, to plan and to invest more environmental friendly while possibly increasing the revenue, too.

The flow of the operational information data OID from the first actor support module 20 to the first actors 7 via the interface 50b is shown by bold dotted arrows in FIG. 1. These arrows show that said data OID may be transmitted from the first actor support module 20 to any of the first actors, i.e. the generators 3, the consumers 4 or the DSOs 5. The providing of operational information data OID to the first actors 7 may also be referred as "first function" in this disclosure.

Moreover, the first actor support module 20 may provide the operational information data OID, among others, to a second actor support module 30 via the internal communication links between the modules of the platform device 1. This may be referred as "second function" in this disclosure.

The second actor support module 30 is configured to determine or calculate indicator and certification data ICD which can be transmitted to a second group of actors of second actors 2 via the interface 50a. The transmission is shown by the bold unbroken arrow in FIG. 1 which connects the second actor support module 30 and a box in FIG. 1 marked by the reference sign 2 which shall indicate one or more second actors 2. The second actors 2 may also be referred to as "users" of the platform device 1 in sense that, e.g., the ICD data may be transmitted to the user, among others, by displaying the data via a GUI through which the users interact with the platform device 1. The indicator and certification data ICD shall preferably include, e.g., indicators, such as KPIs, in view of business success and technology aspects and environmental aspects. For example, they may include a first score (briefly: "S1") that may be an energy coloring score, named Score 1, and that may be defined based on each environmental contribution of a project, asset or the like of one of the first actors. The second score may be a business performance score (briefly: "S2"), named Score 2, and may be defined based on the increased revenues or decreased costs. A principle for determining the Score 2 may be based on the relation between the power system constraints managed by the DSO 5 and the revenues or cost of the generators 3 and consumers 4. Increasing the use of the grid reinforcements invested by the DSO 5, for example, used by the generators 3 and consumers 4 may increase Score 2 of the DSO 5. Increasing the integration of generation to avoid curtailment may increase Score 2 of the DSO 5. Enabling access to cheaper electricity may increase Score 2 of the consumers 4.

Both scores can be optimized via the recommendations via the operational information data OID and it can also be done simultaneously such as by increasing the integration of specifically renewable energies. Based on the interdependence of generators 3, consumers 4 and DSOs 5 to enhance both scores 1 and 2, from the individual drive to enhance own scores emerges the enhancement of the scores of other participants. If the above described scores S1, S2 should be, among others, part of the indicator and certification data ICD, they may be transmitted or displayed to the users of the second actor group 2 so that, e.g., users, such as investors, may make their decisions based on the indicator and certification data ICD with improved reliability and less uncertainty.

The interaction of users, such as investors or official regulators, the public or the like, among the second actors 2 may have two preferred paths. The interaction of the second actors 2 may be directly with the first actors 2, for example, for direct investments or provision of resources or the like. This is shown by the dotted-broken arrows in the upper part of FIG. 1 which connect the first actors 7 (3,4,5) with the second actors 2. Further, alternatively or additionally, the second actors 2 may interact with a transaction module 40 of the platform device 1, e.g., via the interface 50e. This is shown by the dotted-broken arrow in the lower part of FIG. 1 connecting the module 40 and the second actors 2. The latter interaction may be carried out by clicking in a GUI on a software button or the like, preferably further including a verification step of the identity of the user based on platform-internal databases which allow to check identify features of the users against actual identify input, i.e., biometric authorization or password authorization or the like. The connection between the transaction module 40 and the user may be end-to-end encrypted for high safety and data security.

The before mentioned transaction module 40 may receive data internally, as shown by the arrows inside the platform device 1, from the data gathering module 10 and the first actor support module 20 which provide the operational data and the operational information data to the transaction module 40. The transaction module 40 may then compute, based on said input, tradeable project products in an automated manner, which, e.g., allow the users to invest in a project of one or more of the first actors 7. The products may be generated or computed, preferably, by an artificial intelligence which was trained by data, such as tradeable stock or other investment products that have been produced by a human person based on the operational data and/or the operational information data so that the artificial intelligence can learn the patterns and schemes for the generation of such products. For example, training data may include as well as product data if a generator 3 wants to establish a new wind farm and provides operational data about the wind farm, such as planned output power, costs, etc., to the data gathering module 10, a product may be created based on said operational data so that a user may buy a share of the new wind farm by a trade via the platform device 1.

If the user interacts with the transaction module 40 and invests into a product, e.g., the contractual data and possible payments may be guided via the transaction module 40 to the respective first actor 7 via the interface 50d and as shown by the double-dot-broken arrows therebetween. Also it is possible that the user or the first actors 7 interact with other outside markets 6a, like a stock exchange or the like, and may provide external obligations of the users 6b. Further, via the trading/transaction module 40 it may also be possible, as also indicated by the reverse side of the double-dot-broken arrows that the first actors 7 transmit revenues or the like via the transaction module 40 to the users being the second actors 2. This may be referred as "third function" in this disclosure.

One can hence summarize that the platform device 1 or the apparatus 100 allow for providing a superior IT infrastructure to coordinate/facilitate transactions between different external actors/users and to improve the drive to a greener energy infrastructure at the same time. The platform device 1 allows to provide the relevant data management, e.g., by way of the above explained modules of the platform device 1, it provides data safety and security because of the encrypted data communication and a respective encryption of all relevant data bases within the platform device 1, and as mentioned before it allows fora variety of transactions between different actors of the energy infrastructure which a focus on green energy, e.g. such as enabled by the performance indicators S1 and S2 or other others.

Figure 2:
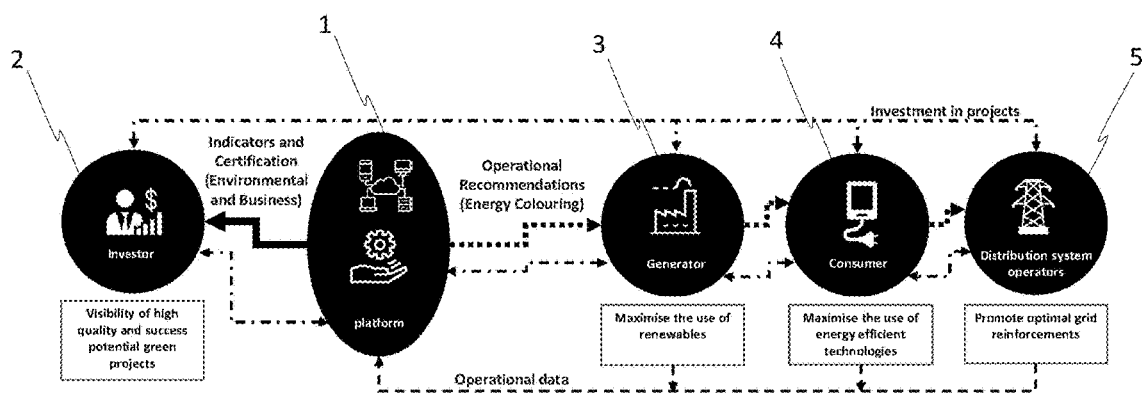
FIG. 2 shows possible paths of interaction between the apparatus described herein and external actors.

FIG. 2 illustrates a possible flow of data and/or information between the platform device 1 and the actors 2, 3, 4 and 5 in a conceptual manner and the same arrow formats are used as explained for FIG. 1. The so-called first function is in particular the flow of data/information from the platform device to the right side in the FIG. 2 to the generators 3, the consumers 4 and the DSOs 5, while the second function is the data flow to the left side in FIG. 2 which goes from the platform device 1 to the users, such as investors. The third function is the facilitation of transactions in view of tradeable products and the like which is schematically shown by the dotted-broken arrows in FIG. 2.

The platform device 1 may preferably be a web-based platform accessible remotely via the internet by a plurality of actors/users which has the automated technical functions of providing recommendations to the actors, providing indicators to the users, allowing trading and exchange of contractual data, payments, etc. pp. The following challenges, especially, are thereby met:

Generators 3 face challenges that there are limited DSO capacity which limit the potential revenue from generated electricity, that there is uncertainty about the future grid configuration and capacity as well as the demand from competitors, that there is uncertain matching of efforts to achieve the goal of decarbonisation, about the uncertainties related to the invest in new renewable energy capacity, the lack of space or expensive land, and the long-term considerations of power plant projects which can have a life expectancy of many decades.

DSOs 5 face challenges of uncertain matching of efforts to achieve the goal of decarbonisation, regulation requirements, different technical requirements, e.g., depending city and countryside infrastructure and the like.

Consumers 4 face the challenges of too long energy contracts, lack of visibility about energy source, lack of incentive to consume green energy or to be more efficient, and the like.

Investors 2 find it difficult to verify the environmental contribution of projects, lack of predictability, lack of knowledge and/or information and lack of visibility of high-quality project investment opportunities.

The apparatus 100 brings all of these actors and the relevant information together and provides data insight for all of the actors in the form of project recommendations or investment proposals or information as well tradable projects. It therefore facilitates the interaction of all relevant actors of the energy infrastructure provides incentives for greener energy contribution.

The FIG. 3 furthermore illustrates an example for the scalability of projects which are administered by the platform device 1. For example, the very left hand side schematic having the title "single project level" shows a possible mix of different of projects of first actors 7, such as a hydrogen generation project, an energy generation project, as well as a project for a grid and a gas infrastructure and an energy consumption project in view of data centers, railway projects, buildings, or the like. The single project can then be expanded to a local level and our even to a country or an entire region wherein the boundaries for the projects and the like will be taken into consideration at each level.

The scalability of the platform device may have two approaches: beyond power systems it may include, firstly, extension of interdependence and compatibility consideration to provide operational recommendations in associations with other infrastructures such as water, mobility, gas, etc.; and, secondly, extension from local, to regional, national, etc.

In view of the second function described above, in view of using the potential or actual collaboratively enhanced environmental and business performance, the present disclosure may improve and provide:

Indicators for the decision-making processes of actors determining the allocation of resources to projects. Stakeholders include but are not limited to investors as other stakeholders such as regulators, donors or public also play a key role. The indicators may include or be may be used in the context of compliance, risk and/or opportunity assessments as a guide to determining the allocation of resources. Further, the second function allows more efficient allocation of financial resources directly or through the platform with lower uncertainty for stakeholders determining the allocation of resources and allowing them to provide better terms to projects, the potential is based on calculated operational recommendations, and the actual is based on enabled operational recommendation through facilitated trading and certification, also supported by the third function.

Certifications about the fulfilment of physical, financial, and other obligations during planning, construction, operation and decommissioning project phases. There is also certified the consistency between operational recommendations, indicators and transactions.

Further, to enable the operational recommendations, the allocation of resources and the execution of payments, the platform device 1 facilitates transactions via the third function:

Between generators 3, consumers 4 and system operators 5 in view of transactions related to energy consumption between generators 3 and consumers 4, transactions related to network use between system operators 5 and generators 3, transactions related to network use between system operators 5 and consumers 4, as well as between investors 2 and first actors 7 including transactions related to investment from investors to first actors 7, transactions related to repayments of first actors 7 to investors 2, as well as between platform users and external parties, such as integration with external obligations or incentives, e.g., tariffs, taxes, etc.

In view of the operational information data, i.e. operational recommendations, each operational recommendation can become a product, i.e. a productization of operational recommendations, that can be traded and certified as it is or it can be discretized to match equivalent N products or assets inside or outside the platform device 1 that are exchanged for, and vice-versa. Transactions and certifications in the third function are facilitated by the platform as a Third-Party Intermediary service that intermediates from transactions matchmaking to doing and clearing multiple trading and contract modalities, including 1-to 1, such as direct, peer-to-peer, through broker; 1-to-N, e.g., the product of one provider is discretised into multiple products for N users; N-to-1, e.g., the products of N providers are aggregated into one product for one user; N-to-N, e.g., the products of N providers are discretised and/or aggregated into one into multiple products for N users. For example, provider 1 has a product of 2 units and provider 2 has a product of 1 unit, user 1 requires a product of 2.5 units and user 2 requires a product of 0.5 units.

In the platform device 1, the incentives create a network effect or virtuous cycle in which as the number of users increases the value increases, specifically:

The more generators 3, consumers 4 and system operators 5 join the platform, the more options there are for identifying the mutually enhancing operational recommendations resulting in even higher and more certain environmental and business performance.

The more second actors 2 determining the allocation of resources to projects join, the more generators 3, consumers 4 and system operators 5 are encouraged to join resulting in even higher and more certain environmental and business performance, which facilitates the decision-making process and likelihood to allocate resources to projects.

The more users 2 join, the more liquidity there is to enable the transactions associated with operational recommendations with higher environmental and business performance.

The three functions are provided through the platform device 1 in which first and second actors 7, 2 determine the allocation of resources to projects and which have platform profiles stored in a database. Databases are not explicitly shown and may be part of the computer program product of the apparatus 100. The user profiles may also include user identification data so that a user can be identified and this increases trust and data safety, e.g. in view of trades. The assets or machinery and the like of the first actors 7 provide operational data which is gathered by the data gathering module 10, based on which operational information data, such as operational recommendations and indicators can be determined. These may be distributed to the first and/or second actors 7, 2 as explained above and transactions can be performed via the transaction module 40. Certifications can also be handled by the platform device 1 and each user can determine and set the level of detail of information which said user may deem necessary for the operations.

Figure 4:
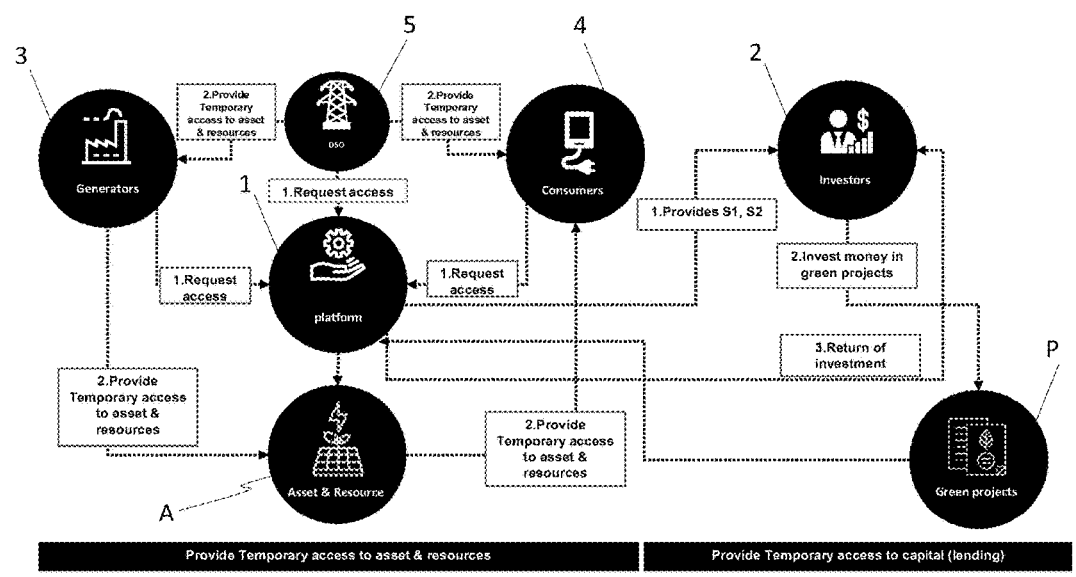
FIG. 4 shows an example of a network of actors and the apparatus described herein.

FIG. 4 further shows an example scenario for the interaction between the different actors and the platform device 1/apparatus 100. The schematic is divided into a left and a right side. The left side shows the temporary or permanent access to assets or resources of actors which is controlled by the platform device 1. For example, a first actor, such as a generator 3, a DSO 5 or a consumer 4, may request access to an asset and interacts with the platform device 1, e.g., by way of clicking a respective command button or the like in a GUI. This is shown by the "request access"-marked arrows. Then the platform device 1 may provide the request to the, e.g., generator 3 in this example of FIG. 4 which then provides the access to the asset/resource shown by "A" in the Figure and this is provided to a consumer 4 in this example, indicated by the arrows "provide temporary access to asset &resources". Further, also a direct link may be established for access, such as shown by the arrows from the DSO 5 to the generators 3 and the consumers 4.

On the right-hand side of FIG. 4, the platform device 1 is connected to users 2 of the second actor group and green projects P are shown as products. Then, the platform device 1 supports the users 2 with, e.g., indicators such as scores S1 and S2 so that they can decide about investments and can realize them via the platform device 1 as shown by the further arrows between the users 2, the green project product P and the platform device 1.

Figure 5:
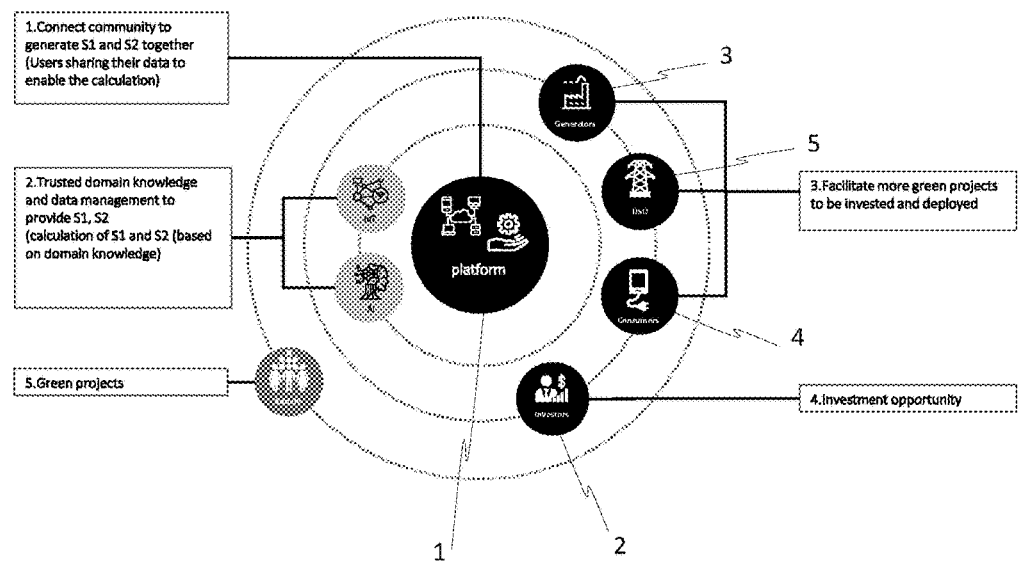
FIG. 5 shows a diagram which highlights the benefits of the disclosure on different levels.

This leads to benefits on different levels which is depicted in FIG. 5. The platform apparatus 100 connects the different actors and provides data management, data knowledge and data security also using blockchain technology, IOT data, and the like. Further, first actors may realize better green projects while second actors 2 can find better and trustable investment opportunities while the society as a whole can enjoy improvements in the transition to a green energy infrastructure. In other words, the platform 1 also enables transparency and visibility about energy colouring, such as the score S1 (i.e. a quantified environmental impact), and it allows higher revenues based on score S1, the promoting of projects using price differentiation, and a heterogeneous field of peer-to-peer interactions between and with first actors. The score S1 also allows to include system constraints which are, e.g., imposed by or through the first actors 7. Further, due to the score S2, predictability of project success is enabled for easier financing to achieve low carbon power systems and viability considerations including the financial and technical interdependence are possible. Moreover, the visibility of high-quality projects for investors based on Score S2 is given and this accelerates mobilisation of capital towards sustainability (efficient use of resources: energy, money, etc.).

Figure 6:
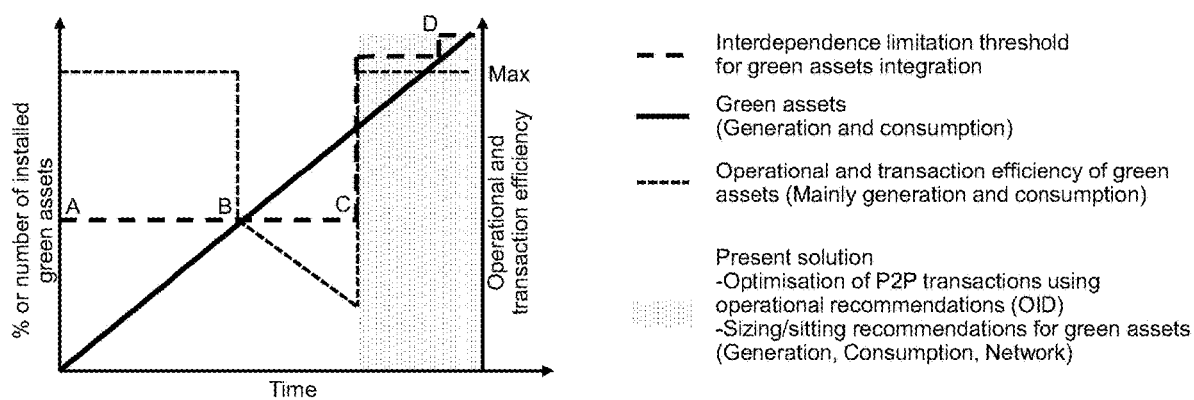
FIG. 6 shows a scenario for increasing an interdependence limitation threshold.

FIG. 6 shows an example scenario for an increased interdependence limitation threshold which can be achieved by the platform device 1 by way of improved peer-to-peer transaction facilitation. The graph shows the time on the x-axis and the relative share (in percent) or the number of installed green assets, such as solar power plants, wind turbines, efficient consumers, or the like. The bold broken line in FIG. 6 shows the interdependence limitation threshold for green assets which is present when the number of green assets causes technical limitations or issues such as the high/low voltage being beyond suitable limits resulting in, e.g., curtailment of renewables, inability to charge EVs, use of heat pumps, etc. The bold line which constantly increases in this scenario from zero at the origin of the graph shall depict the green assets, especially for green power generation and/or consumption. The interdependence limitation threshold represents the capacity of the (energy) network so the bold line represents the "%" or number of installed green assets installed in the network. Green generation assets may be particularly related to variable renewable energies (such as solar or wind power), which are the ones more likely to cause interdependence issues, and controllable (such as biomass, geothermal power, etc.). Green consumption assets may include EVs, EV chargers, electrolysers, heat pumps, etc. Further, the dotted line in FIG. 6 represents the variation over time of the operational and transaction efficiency of green assets, which may relate mainly to the generation and consumption of power/electricity. If the relative share or the number of installed green assets installed in the network is above the interdependence limitation threshold, the physical implementation of peer-to-peer transactions cannot be carried out which reduces the operational and transaction efficiency reducing expected revenues. In this context, there is a need of operational control for quality, stability and economic efficiency. More specifically, FIG. 6 shows a scenario between points in time marked with "A", "B", "C" and "D". At point "A", the grid has a certain capacity of the relative share or number of installed green assets that can be connected without affecting the operational and transaction efficiency. At this point the interdependence can be ignored because the grid capacity is large compared to the relative share or the number of installed green assets. Between the points "A" and "B", the relative share or the number of installed green assets gradually increases and gets close to the interdependence limitation threshold. As they increase there could be none or only rare cases in which the operational and transaction efficiency if affected. The increase is shown by the bold line. Then, at point "B", the relative share or the number of installed green assets crosses the interdependence limitation threshold. Beyond this point the cases in which the operational and transaction efficiency if affected increases with a further increase of the relative share or the number of installed green assets. Therefore, between "B" and "C" the operational and transaction efficiency falls with the further increase of the relative share or the number of installed green assets. At point "C", the present solution with regard to peer-to-peer transaction facilitated by the platform device 1 including the functionality of the data gathering module 10 and the transaction module 40 is implemented (see shaded area of FIG. 6). This results in the increase of the interdependence limitation threshold by means of 1) optimisation of peer-to-peer transactions using the operational recommendations and 2) sizing and/or sitting recommendations for green assets (Generation, Consumption, Network), i.e. software and hardware means are implemented to increase the interdependence limitation threshold. Hence, at point "D", the continuous increase of the relative share or the number of installed green assets results in a situation in which the relative share or the number of installed green assets gets closer again to the interdependence limitation threshold. The developed solution monitors the interdependence limitation threshold and the relative share or the number of installed green assets to repeatedly take measures that ensure that the interdependence limitation threshold is above the relative share or the number of installed green assets resulting in ensuring the maximum operational and transaction efficiency. This process is repeated as the power system is transformed into a low carbon power system.

Figure 7:
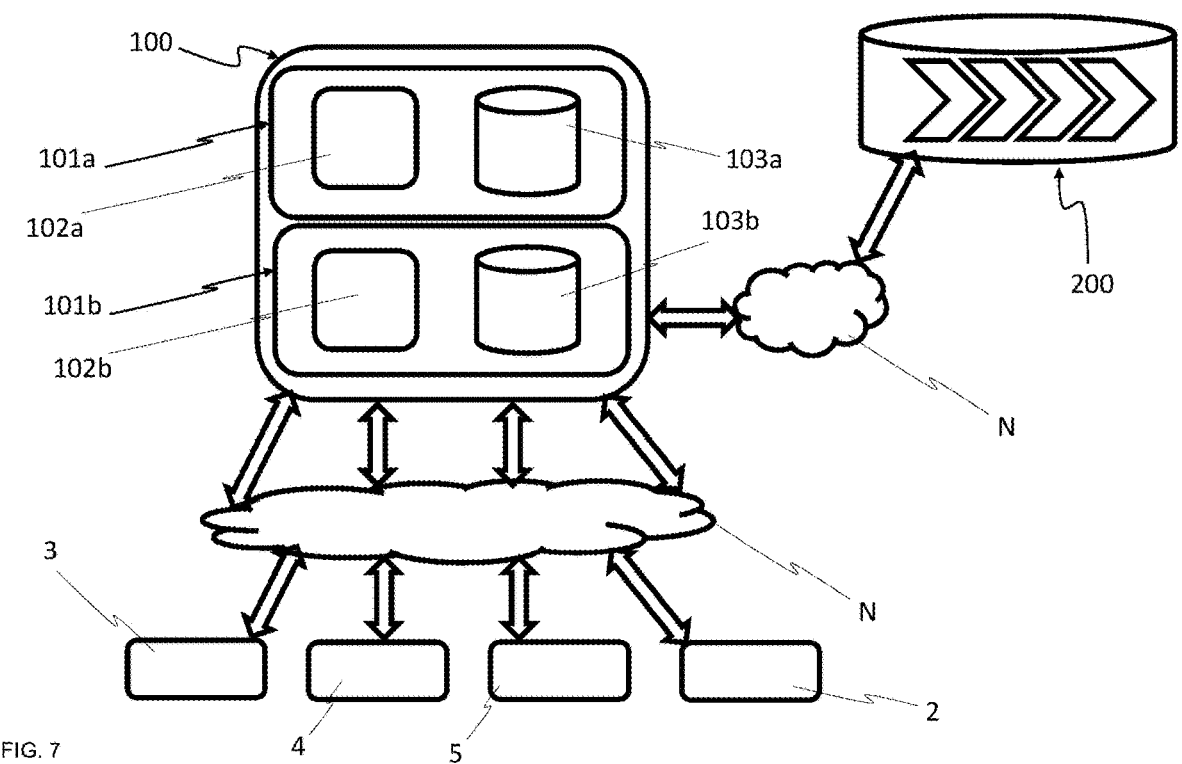
FIG. 7 shows a possible technical implementation of the apparatus connected to other entities or actors via a network.

Further, FIG. 7 shows a possible system configuration with regard to the integration of the apparatus 100 into a network N and providing communication connections with external entities. For example, the apparatus 100 may include a plurality of computers 101*a*, 101*b* which may be located at a single location or which may be distributed over a network themselves (not depicted). These computers may include, e.g., data storage units 103*a*, 103*b* and computing units 102*a*, 102*b*. Preferably, the platform device 1 is a software-based program product and may be stored in one or more of the data storage units 103*a*, 103*b*. Then, as an operational example, first actors 3, 4, 5 (summarized to 7 in the description above), and/or second actors 2 may connect preferably temporarily with the apparatus 100/the platform device 1 to interact with it, e.g., by receiving or transmitting data and/or control signals. This is shown by the bold double arrows and the cloud being indicated by N in the middle which shall schematically depict that the communication channels are provided by a network N or by multiple networks or the like, preferably the internet. These communication channels or connections between each of the actors and the apparatus 100 are used to exchange data as explained above, e.g., operational information data OID or the like. In order to increase the trust and data security, preferably, this is end-to-end encrypted and a verification for log in to the apparatus 100 is required. Further, there is an example shown in which the communication channels, again shown by the bold arrows and the network N cloud in between, connect the apparatus 100 to a blockchain network or a data storage 200 thereof. The blockchain is schematically shown by the arrow heads within the entity 200 of FIG. 7.

As an example, the blockchain may be used for increasing data safety of and trust in the transactions, e.g., which are facilitated by the platform device 1. This may include the case that the third function is performed and a user invests into a project of a first actor 7 via the transaction module 40. The transactional and contractual data belonging to this transaction may then be stored by the apparatus 100 in the blockchain. Other transactions or the like may be handled accordingly.

Summarizing, the apparatus 100 with the platform device 1 provide a technical concept which allows to coordinate and/or facilitate interactions with external actors and in between external actors and to provide a reliable, trustable, date-secure agent for actors in the energy-related infrastructure or systems.

As will be appreciated by one of skill in the art, the present disclosure, as described hereinabove and the accompanying figures, may be embodied as a method (e.g., a computer-implemented process or any other process), apparatus (including a device, machine, system, computer program product, and/or any other apparatus), or a combination of the foregoing.

Aspects/Examples of the present disclosure may be a software entirely (including firmware, resident software, micro-code, etc.), or a combination of software and hardware aspects that may be referred to as a "system". Furthermore, the present disclosure may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

The present disclosure may be described with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

The computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the disclosure.

It should be noted that terms such as "server" and "processor" may be used herein to describe devices that may be used in certain aspects of the present disclosure and should not be construed to limit the present disclosure to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present disclosure should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternatives may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the disclosure, and should not be construed to limit the present disclosure to any particular logic flow or logic implementation. The described logic may be partitioned into different logic blocks (e.g., programs, modules, functions, or subroutines) without changing the overall results or otherwise departing from the true scope of the disclosure.

Often, logic elements may be added, modified, omitted, performed in a different order, or implemented using different logic constructs (e.g., logic gates, looping primitives, conditional logic, and other logic constructs) without changing the overall results or otherwise departing from the scope of the disclosure.

The present disclosure may be embodied in many different forms, including, but in no way limited to, a graphical processing unit as well as computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, python, C, C++, JAVA, JavaScript or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present disclosure may be written in an object oriented, scripted or unscripted programming language such as Java, Perl, Smalltalk, C++, or the like. However, the computer program code for carrying out operations of aspects of the present disclosure may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash 30 memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the disclosure may be implemented as a combination of both software (e.g., a computer program product) and hardware. Still other aspects of the present disclosure are implemented as entirely hardware, or entirely software.

While certain exemplary aspects have been described and shown in the accompanying drawings, it is to be understood that such embodiments are merely illustrative of and are not restrictive on the broad disclosure, and that the aspects of the present disclosure are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described aspects and examples can be configured. Therefore, it is to be understood that, within the scope of the appended claims, the disclosure may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different aspects or examples of the disclosure described herein may be combined to form other aspects or examples of the disclosure.

The invention claimed is:

1. An apparatus enabling interactions between actors of energy-related infrastructure, which comprises a platform device that includes:
    one or more input/output units, which are configured to perform at least one of transmitting data from the platform to actors or receiving data from the actors;
    a data gathering module; and
    a first actor support module,
    wherein the data gathering module is configured to
        receive operational data (OD) from one or more of the actors,
        provide the OD to the first actor support module that is configured to generate operational information (recommendation) data (OID) based on the OD, and
        transmit the OID to a group of one or more first actors, which are at least one of energy generators, energy consumers, or energy system operators, and
    wherein the OID includes at least one of control instructions, recommendations for reducing the generation, recommendations regarding consumption of greenhouse gas, or recommendations for increasing green energy,
    wherein the OID includes system constraints comprising at least one of: power limitations, maximum power generation, minimum power demands, power line capacity, voltage control, and reverse powerflow constraints, and wherein the OID includes an energy coloring scheme that indicates eco-friendliness of energy sources on a scale from dark green for renewable energy to light green or orange for partially carbon-based energy sources.

2. The apparatus according to claim 1, further comprising a second actor support module configured to:

receive the OID from the first actor support module;

generate indicator and certification data (ICD); and transmit the ICD to a group of one or more second actors which are users of the platform device, and wherein the ICD includes information provided to the users about the first group of actors based on at least one of which of the second group of actors can decide about a transaction with one or more of the actors of the first group of actors, or which of the second group of actors can instruct the platform device to perform an automated transaction with one or more of the actors of the first group of actors.

3. The apparatus according to claim 1, further comprising a transaction control module configured to:

receive data from the data gathering module and the first actor support module based on which the transaction control module generates product data which can be displayed to a group of one or more second actors which are users of the platform device.

4. The apparatus according to claim 3, wherein the one or more users can initiate a transaction for obtaining a project product by interacting with the transaction control module.

5. The apparatus according to claim 4, wherein the transaction control module receives the user request for initiating a transaction for obtaining a project product and forwards the request, in an automated manner, to at least one of an actor of the group of first actors to another entity outside of the apparatus so that a contract can be concluded based on the request.

6. The apparatus according to claim 5, wherein the transaction between at least one user of the group of second actors and at least one actor of the group of first actors can be carried out by adding or amending an entry about the transaction in a blockchain network.

7. The apparatus according to claim 1, wherein at least one actor of a group of one or more first actors receives the operational information data transmitted by the first actor support module and initiates a new project in accordance with the OID and feedbacks the OD including OD of the new project to the data gathering module of the platform device.

8. The apparatus according to claim 1, wherein the OID are used to calculate indicator and certification data (ICD) which include performance indicators associated with compliance, risk, and opportunity assessments.

9. The apparatus according to claim 3, wherein the transaction control module, based on the OID, is configured to generate products for at least one of internal trading, trading with external markets, or trading among the first actors.

10. The apparatus according to claim 9, wherein the products are tradeable at least as a whole, as splitable to match an equivalent number of N products or assets inside the platform device, or as splitable to match the equivalent number of products or assets outside the platform device that are exchanged for, and vice-versa.

11. The apparatus according to claim 8, wherein trading results and the OD are integrated into calculating the performance indicators.

12. The apparatus according to claim 3, wherein the transaction control module facilitates transactions of payments, revenues, investments, repayments, and fulfilment of other financial obligations or reporting obligations among platform users and external parties.

13. The apparatus according to claim 1, wherein the OID are calculated by the first actor support module based on interaction beyond at least one system, on operational interdependence among multiple systems, or within systems of systems.

14. The apparatus according to claim 1, wherein the (OID) are based on at least environmental, social, governance, or sustainability considerations.

15. The apparatus according to claim 1, further comprising:

one or more computers which are configured to perform the functions of the platform device.

16. The apparatus according to claim 1, further comprising:

one or more computation units; and one or more data storage units, wherein the one or more data storage units store one or more computer-program products which are configured to perform functions of the platform device.

17. The apparatus according to claim 15, wherein the apparatus is connected via a network to a blockchain network and the data transmitted between the apparatus, via the network, to the blockchain network is encrypted.

* * * * *